Feb. 19, 1929.
J. W. DAVIS
1,702,686
LUBRICATION FOR CAM ENGINES
Filed March 3, 1928
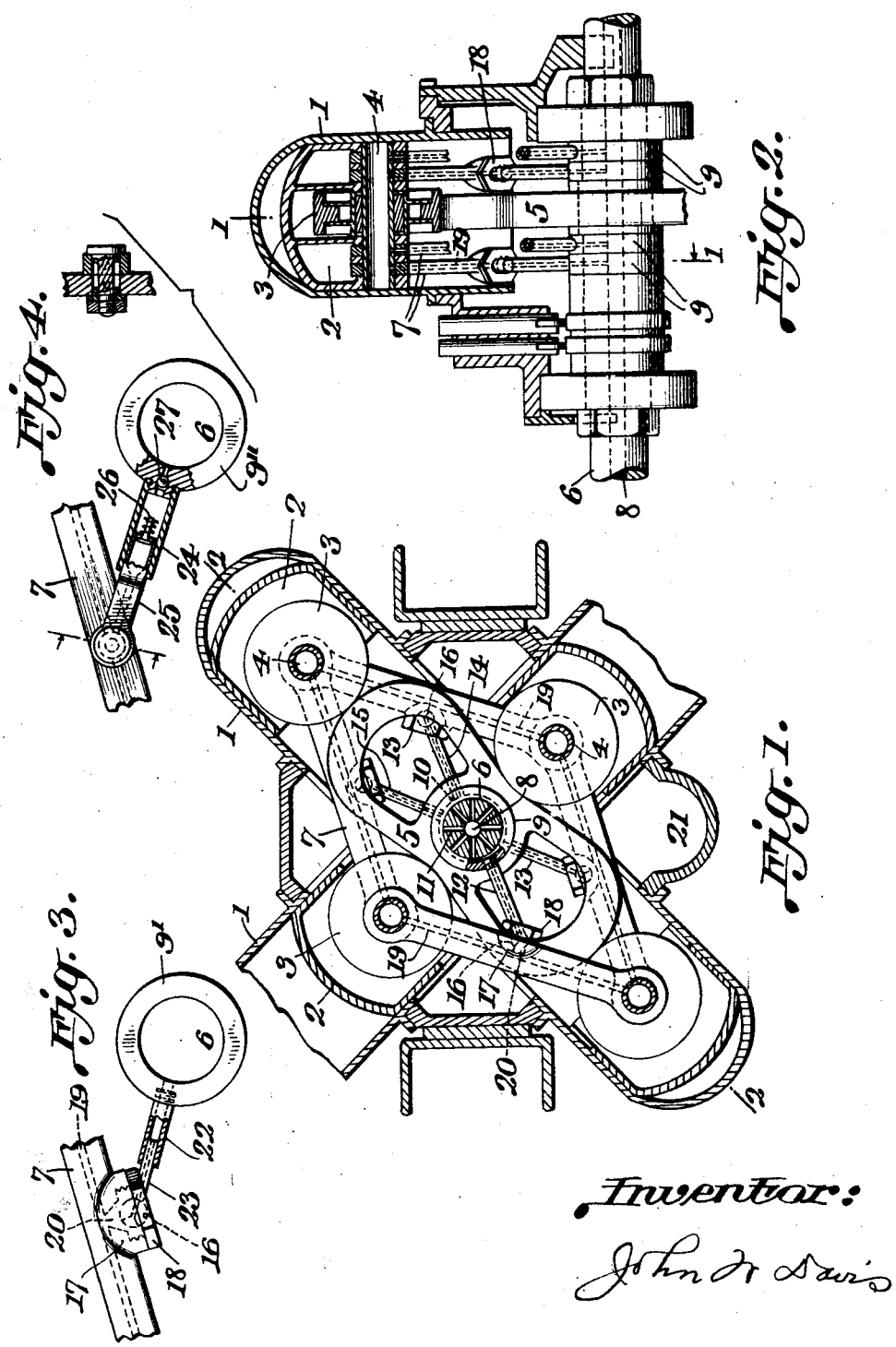

Patented Feb. 19, 1929.

1,702,686

UNITED STATES PATENT OFFICE.

JOHN W. DAVIS, OF WASHINGTON, DISTRICT OF COLUMBIA.

LUBRICATION FOR CAM ENGINES.

Application filed March 3, 1928. Serial No. 258,929.

This invention relates to lubrication of cam engines.

In cam engines the pistons and rollers carried thereby have no direct connection with the drive shaft so that lubrication of these parts has presented difficulties.

It is the custom to convey lubricant under pressure to various places such as cylinder walls, center of the drive shaft, etc., and there release it, lubrication of all moving parts being dependent on the spray and the vapor therefrom.

The drawbacks to such systems are:

1. That a great deal of the lubricant goes to stationary members which do not need it thereby making it necessary to supply much more oil than is necessary;

2. That a portion of the lubricant is thrown against the bottoms of the pistons thereby unduly heating the oil without accomplishing any beneficial results;

3. Failure to supply bearings with cool lubricant because the lubricant that splashes on parts has a tendency to cling in place until it becomes thin by heat;

4. Failure to lubricate properly the bearings of piston rollers of any type and particularly of the type herein recommended.

The systems now in use are very similar in effect to the antiquated splash systems formerly employed on automobile engines.

It is the object of this invention to provide an efficient and simple pressure lubricating system for cam engines.

It is a further object of the invention to utilize such pressure lines as are commonly used,—namely, the line from a pump thru the center of the propeller shaft and to supplement it with a pressure line to the rollers and pistons.

It is a further object of the invention to provide a simple, reliable device of very few parts which will be easy and cheap to manufacture.

It is a further object of the invention to make it possible to build a better roller than has heretofore been possible. Heretofore rollers have been employed of such a type as may be lubricated by the spray. One well known type is the ball bearing roller which due to the space between the balls can receive sufficient lubricant to operate. However, the rollers now employed have a tendency to skid on the periphery of the cam due to the enormous kinetic energy which the roller has at the outer portion of its stroke and to the quick deceleration necessary on its inward travel. Thus, suppose a cam permits a six inch piston stroke and suppose the roller to be of equal radius to the cam hub and suppose the cam to be turning at 1000 R. P. M., then the roller is turning at 1000 R. P. M. on the inner portion of its stroke and at 6000 R. P. M. on the outer portion. To prevent skidding it is necessary to reduce the kinetic energy of the rollers. The kinetic energy is given by the formula $$\frac{\text{mass} \times (\text{velocity})}{\text{radius}}.$$

Therefore the mass must be made as small as possible and the velocity as small as possible by increasing the radius of gyration of the roller as much as possible. I therefore recommend a roller constructed of a highly tempered outer band attached to a babbit or duralumin bearing by thin sheet metal discs. Thus, it is seen that correct engine design as far as the rollers is concerned is dependent upon the lubrication shown herein which will be better understood with reference to the accompanying drawings in which Fig. 1 represents a sectional view of a cam engine taken along line 1—1 of Fig. 2.

Fig. 2 represents a sectional view taken along line 2—2 of Fig. 1.

Fig. 3 represents a modification of the lubricating connection from the camshaft to the roller straps.

Fig. 4 represents a further modification of the lubricating connection from the camshaft to the roller straps.

1 refers to the cylinders of a cam engine, 2 refers to the pistons and 3 the rollers carried by said pistons by means of wrist pins 4. Rollers 3 ride the periphery of a cam 5 mounted on the cam or propeller shaft 6 and are tied together by means of straps 7 pivotally arranged on said wrist pins as shown.

The camshaft 6 has an oil passage 8 extending centrally therethru, adapted to receive oil from a pump not shown. Collars 9 are mounted upon shaft 6 and are adapted to overlie a groove 10 surrounding shaft 6.

Groove 10 communicates with oil passage 8 by means of radially extending passages 11. Rigidly mounted upon collars 9 are rods 12, 13, 14 and 15 which rods are hollow to permit passage of lubricant therethru. The outer end of these rods or pipes are pivotally connected to straps 7 in any desired manner such as the ball and socket arrangement shown wherein ball 16 fits into socket 17 and is packed and held in place by a nut 18 having a spherical seat for ball 16. Rods 7 have passages 19 drilled therein which communicate at all times with the lubricant in the pipes 12, 13, 14 and 15 thru the passage 20. Part of the lubricant is used for the bearings of rollers 3 in the well known manner as it passes from passages 19 to the rollers and the remainder of the lubricant passes into the hollow wrist pins 4 where it is carried to the cylinder walls.

In this type of connection between the straps 9 and the connecting links 7 I have shown a single member 12 because in the case where a cam is employed which gives simple harmonic motion and where the straps are connected direct to the wrist pin, the central point of the straps oscillates on an arc of a circle having its center at the center of the propeller shaft and hence the radius is always constant.

While I have shown four collars 9 and four pipes 12, 13, 14 and 15, it is merely to illustrate the varieties of combinations possible. Thus I may use pipes 12 and 13 as feed pipes and 14 and 15 as returns or I may eliminate pipes 14 and 15 altogether to get simpler construction permitting the oil to be released upon reaching the cylinder walls and falling down into basin 21. Or I may use 12 only as a feed and 13 as a return.

Now, for engines containing such conditions as do not permit the central point of straps 7 travelling on the arc of circles having the center of the propeller shaft as centers, I provide the modification as shown in Fig. 3 in which 9′ refers to the strap surrounding shaft and the connection leading to strap 7 is in two parts, one part 23 adapted to slidably fit within part 22 for the purpose of giving the effects of a flexible connection.

The modification shown in Fig. 4 may be employed as explained for Fig. 3 or it may be used in the modification shown in Fig. 1 merely by offsetting the lead from the center of shaft 6 to link 7 so that the connection does not lead into the center of link. This may be desirable in order to form an auxiliary pump as shown in Fig. 4 in which the connecting line is composed of two members, one member 24 adapted to receive a plunger 25 which constitutes the second part. The bottom of plunger 25 has a nonreturn valve 26 in the bottom thereof which gives a pump action in connection with another nonreturn valve 27 positioned in or near collar 9″.

It is thus obvious that many modifications of a pressure lubricating system for cam engines may be made without departing from the spirit of my invention and I therefore desire to be limited only by the scope of the appended claims in which

I claim:

1. In a cam engine a cam-shaft, pistons, rollers carried by said pistons, connecting links between said rollers and having oil groove extending therethru and a conduit from the interior of said cam-shaft to said groove.

2. In a cam engine, a source of lubricant pressure supply, pistons, and rollers carried by said pistons and a conduit for conveying lubricant under pressure from said source of supply thru said conduit to said rollers.

3. In a cam engine, a lubricating pump, cylinders and pistons in said cylinders and a closed conduit for conveying lubricant under pressure from said pump to the walls of said cylinders.

4. In a cam engine, a lubricating pump, pistons, rollers in said pistons, means for conveying a lubricant from said pump to said pistons and to the bearings of said rollers under pressure.

5. In a cam engine, a cam and camshaft, pistons and rollers in said pistons, links connecting each piston roller with adjacent rollers and having an oil groove therein, lubricant under pressure within the camshaft and a conduit for conveying the lubricant from said camshaft to said links and to the bearings of said rollers.

6. In a cam engine, a cam, a camshaft, pistons, rollers in said pistons, said rollers being connected by links having an oil passage therethru, an oil passage in said camshaft and a pipe line leading from said camshaft to the passage in said links, said pipe line adapted to supply lubricant continuously under pressure to said rollers and pistons.

7. In a cam engine, a camshaft having an oil passage thru the center thereof, radial openings from the center of the shaft and a collar adapted to surround said shaft and to cover said openings, a passage leading from said collar and adapted to permit passage of oil therethru from said radial openings in said shaft, connecting links between various pistons and a hollow connection between said collar and said links whereby oil may pass thereto.

8. In a cam engine, pistons, rollers carried by said pistons, links connecting adjacent rollers, and a lubricating pump dependent for actuation upon the vibrations of said links.

9. In a cam engine, pistons, rollers carried by said pistons and connected by links to adjacent rollers, a primary lubricating pump, and a secondary lubricating pump, said secondary pump being dependent upon the movement of said connecting links for actuation.

10. In a cam engine, a camshaft having an oil passage therethru and radial ports leading from said passage, a collar overlying said ports, a cylinder rigidly mounted on said strap and adapted to communicate with said radial passages, hollow links connecting adjacent piston rollers, a hollow member pivotally attached to said connecting links and adapted to be slidably received by said cylinder and means for supplying a lubricant from said shaft thru said ports to said rollers.

Hereunto affixed my signature.

JOHN W. DAVIS.